United States Patent Office 2,789,987
Patented Apr. 23, 1957

2,789,987

RACEMIZATION OF OPTICALLY ACTIVE DEXTROROTATORY COMPOUND

John J. Garbarini, Dumont, and William K. Manz, Park Ridge, N. J., and Jerry Robert D. McCormick, New City, N. Y., assignors to American Cyanamid Company, New York, N. Y., a corporation of Maine No Drawing. Application January 28, 1952, Serial No. 268,675

4 Claims. (Cl. 260—343.6)

This invention relates to the racemization of dextrorotatory - alpha - hydroxy - beta,beta - dimethyl - gamma-butyrolactone to produce a mixture of the levorotatory and dextrorotatory isomers.

As is well known, levorotatory-alpha-hydroxy-beta,-beta-dimethyl-gamma-butyrolactone is a commercially valuable compound useful in the synthesis of pantothenic acid. On the other hand, dextrorotatory-alpha-hydroxy-beta,beta-dimethyl-gamma-butyrolactone, as such, has no known commercial utility. Since, in a synthetic method of producing the lactone, a mixture of the enantimorphs is produced and this mixture resolved to obtain the levorotatory lactone, it can be seen that the dextrorotatory lactone is a by-product of pantothenic acid production and that a method of utilizing the same would be of great value. By racemizing each batch of the dextrorotatory lactone and adding the resulting racemic mixture to an original freshly synthesized batch of the racemic mixture before resolution, substantially all of the dextrorotatory form can eventually be utilized in the production of pantothenic acid.

Because of the pressing need for a process of this type, numerous attempts have been made to devise a satisfactory method for racemization and the results of such experiments have been reported in the chemical and patent literature. However, none of the reported methods have been completely satisfactory in all respects. Some of the reported methods require the use of pressure equipment, which of course is expensive and undesirable, and others of the reported methods require the use of expensive organic solvents which must be subsequently separated from the lactone. The new process of this invention makes available a simple method of racemization which does not require the use of pressure equipment nor the use of organic solvents.

According to the process of this invention the dextrorotatory - alpha - hydroxy - beta,beta - dimethyl-gamma-butyrolactone is treated with sufficient alkali metal hydroxide to convert from .02% to 5% of the lactone to the sodium salt of the corresponding acid (beta,beta-dimethyl-alpha,gamma-dihydroxybutyric acid), and the resulting mixture of lactone and sodium salt heated at substantially atmospheric pressure and at a temperature of from about 140° C. to about 240° C. in the absence of an organic solvent. The process may be performed under hydrous or anhydrous conditions, but the reaction mixture should contain insufficient water to lower the reflux temperature thereof below the minimum reaction temperature of about 140° C.

Several attempts have been made to employ the alkali metal hydroxides in the absence of organic solvents in the racemization of dextrorotatory-alpha-hydroxy-beta,-beta-dimethyl-gamma-butyrolactone, but these attempts were made employing large quantities of alkali metal hydroxide and were either unsuccessful or resulted in the necessary use of pressure equipment. For instance, in U. S. Patent No. 2,434,061 to John Weijlard and John Paul Messerly, it is reported that the attempted racemization employing a strong alkali, such as sodium hydroxide in the absence of a solvent or in the presence of a polar solvent such as water, produces a reaction of explosive violence resulting in the almost complete decomposition of the lactone, and in the "Journal of American Chemistry Society," July 1940, pages 1785 to 1790, a process is reported where a large quantity of aqueous solvent is employed and the lactone completely reconverted to the sodium salt of the acid, but this process requires the use of pressure equipment. The difficulties in the above process are overcome by the new process of this invention wherein only a small quantity of alkali metal hydroxide is employed.

The new process of this invention has many advantages. For instance, by the use of a small quantity of sodium hydroxide the reaction mixture is at all times maintained at a pH below 7 and does not, therefore, injure the glass lined containers ordinarily employed in the manufacture of pantothenic acid, and since substantially atmospheric pressure is employed, the use of special autoclaves is not necessary. In addition to the above, no organic solvents are necessary and the racemized mixture can be added directly to a freshly prepared racemic mixture of alpha - hydroxy - beta,beta-dimethyl-gamma-butyrolactone without the need for separation from solvents. In addition, since the percent of sodium salt of beta,beta-dimethyl-alpha,gamma-dihydroxybutyric acid is so small, there is usually no necessity for converting the same to the lactone unless desired. Other advantages include a reasonably short reaction time and the relatively small volumes which need be handled.

The reaction is preferably performed under substantially anhydrous conditions by the use of flake sodium hydroxide; however, an aqueous solution of the alkali metal hydroxide, for instance a 50% aqueous solution of sodium hydroxide, may be employed provided the alkali metal hydroxide solution is not so dilute that it results in a reaction mixture having a reflux temperature below about 140° C. Of course, this allows the use of any reasonable concentration of alkali metal hydroxide, and even if a slight excess of water is added, it can be removed by evaporation so that the reflux temperature of the mixture is raised to above about 140° C. The racemization is substantially complete after one-half to two hours, although of course, the heating can be continued for much longer periods, for instance, eight to ten hours, if desired. While the racemization may be effected at any temperature within the range of about 140° C.–240° C., the preferred temperature range is 150° C.–200° C. For instance a very satisfactory procedure has been found to comprise heating at a temperature of about 160° C. for about two hours.

The new process will be more particularly illustrated by the following specific examples in which all parts are by weight unless otherwise indicated.

Example I

Two parts of flake sodium hydroxide were added to 200 parts of substantially anhydrous molten (about 100° C.) dextrorotatory - alpha - hydroxy-beta,beta-dimethyl-gamma-butyrolactone and the mixture stirred ninety minutes at 160° C. A sample was removed and found to be essentially pure racemic lactone.

Example II

One part of 50% aqueous sodium hydroxide was added to twenty parts crude dextrorotatory-alpha-hydroxy-beta,-beta-dimethyl-gamma-butyrolactone as recovered from the lactone resolution process. The pH of the mixture after dilution with an equal volume of water was 6.0 to 6.5. The mixture was heated to 160° C. for eight hours and then distilled at 150° C. under a vacuum of 28" of mercury. The distillate was substantially pure racemic lactone.

In place of the sodium hydroxide employed in the above examples, other alkali metal hydroxides, for instance potassium hydroxide, can be employed.

We claim:

1. The method for the racemization of dextrorotatory-alpha - hydroxy-beta,beta-dimethyl-gamma-butyrolactone which comprises treating a quantity of said lactone with sufficient alkali metal hydroxide to convert from .02% to 5% of said lactone to an alkali metal salt of beta,beta-dimethyl-alpha,gamma-dihydroxy-butyric acid, and heating the resulting mixture at substantially atmospheric pressure and at a temperature of from about 140° C. to 240° C. for at least one-half hour, said mixture being substantially free of organic solvents and containing insufficient water to lower the reflux temperature thereof below about 140° C.

2. The method of claim 1 where said mixture is substantially anhydrous and where said alkali metal hydroxide is sodium hydroxide.

3. The method for the racemization of dextrorotatory-alpha - hydroxy-beta,beta-dimethyl-gamma-butyrolactone which comprises treating a quantity of substantially anhydrous molten dextrorotatory-alpha-hydroxy-beta,beta-dimethyl-gamma-butyrolactone with sufficient flake sodium hydroxide to convert from .02% to 5% of said lactone to the sodium salt of beta,beta-dimethyl-alpha,-gamma-dihydroxybutyric acid and heating the resulting mixture at substantially atmospheric pressure, in the absence of an organic solvent, and at a temperature of from about 150° C. to 200° C., for from about one-half to eight hours.

4. A process for the racemization of dextrorotatory-alpha - hydroxy-beta,beta-dimethyl-gamma-butyrolactone which comprises heating said isomer with about 1% by weight of alkali metal hydroxide based on the weight of the isomer at about 150° C. for about one-half hour in the absence of a solvent.

References Cited in the file of this patent
UNITED STATES PATENTS

| | | |
|---|---|---|
| 2,377,390 | Weijlard et al. | June 5, 1945 |
| 2,383,524 | Fishles et al. | Aug. 28, 1945 |
| 2,434,061 | Weijlard et al. | Jan. 6, 1948 |
| 2,463,734 | Beckmann | Mar. 8, 1949 |
| 2,474,719 | Beutel et al. | June 28, 1949 |

FOREIGN PATENTS

| | | |
|---|---|---|
| 552,705 | Great Britain | Apr. 21, 1943 |

OTHER REFERENCES

Stiller et al.: "Jour. Am. Chem. Soc.," July 1940, pages 1785–90.